(12) United States Patent
Umekida

(10) Patent No.: US 9,434,209 B2
(45) Date of Patent: Sep. 6, 2016

(54) WHEEL BEARING APPARATUS

(71) Applicant: NTN Corporation, Osaka (JP)

(72) Inventor: Mitsuru Umekida, Iwata (JP)

(73) Assignee: NTN Corporation, Osaka-shi (JP)

(*) Notice: Subject to any disclaimer, the term of this patent is extended or adjusted under 35 U.S.C. 154(b) by 0 days.

(21) Appl. No.: 14/447,708

(22) Filed: Jul. 31, 2014

(65) Prior Publication Data
US 2014/0339885 A1 Nov. 20, 2014

Related U.S. Application Data
(63) Continuation of application No. PCT/JP2013/052218, filed on Jan. 31, 2013.

(30) Foreign Application Priority Data
Feb. 1, 2012 (JP) ................. 2012-019966

(51) Int. Cl.
*F16C 35/06* (2006.01)
*B60B 27/00* (2006.01)
(Continued)

(52) U.S. Cl.
CPC ....... *B60B 27/0026* (2013.01); *B60B 27/0084* (2013.01); *C21D 1/06* (2013.01); *C21D 9/32* (2013.01); *C21D 9/40* (2013.01); *C22C 38/02* (2013.01); *C22C 38/04* (2013.01); *C22C 38/06* (2013.01); *C22C 38/12* (2013.01); *F16C 35/063* (2013.01); *B60B 27/00* (2013.01); *B60B 27/001* (2013.01); *B60B 27/0068* (2013.01); *B60B 27/0078* (2013.01); *B60B 2310/54* (2013.01); *B60B 2900/311* (2013.01); *B60B 2900/321* (2013.01); *C21D 1/42* (2013.01); *F16C 19/386* (2013.01); *F16C 41/007* (2013.01); *Y02P 10/253* (2015.11)

(58) Field of Classification Search
CPC .............................. B60B 35/14; B60B 35/18
See application file for complete search history.

(56) References Cited

U.S. PATENT DOCUMENTS
6,193,419 B1   2/2001   Krude et al.

FOREIGN PATENT DOCUMENTS
JP   58-122205   7/1983
JP   08-105908   4/1996
(Continued)

*Primary Examiner* — Thomas R. Hannon
(74) *Attorney, Agent, or Firm* — Harness, Dickey & Pierce, P.L.C.

(57) ABSTRACT

A wheel bearing apparatus has an outer member, an inner member including a wheel hub and at least one inner ring, and double row rolling elements freely rollably contained between the inner and outer raceway surfaces of the inner and outer members via cages. A hardened ring-shaped gear member is mounted on an end of a cylindrical portion of the wheel hub. The gear member is formed with a gear portion on its outer circumference and with a splined portion on its inner circumference. The splined portion engages a hub-splined portion formed on the outer circumference of the cylindrical portion of the wheel hub. A contacting surface of the gear member and a contacting surface of the inner ring that abut against each other are ground. The inner rings are axially immovably secured under a condition where a predetermined amount of a bearing pre-stress is applied to the inner rings via the gear member.

9 Claims, 7 Drawing Sheets

(51) Int. Cl.
  *C21D 9/32* (2006.01)
  *F16C 35/063* (2006.01)
  *C22C 38/02* (2006.01)
  *C22C 38/04* (2006.01)
  *C22C 38/06* (2006.01)
  *C22C 38/12* (2006.01)
  *C21D 9/40* (2006.01)
  *C21D 1/06* (2006.01)
  *F16C 41/00* (2006.01)
  *F16C 19/38* (2006.01)
  *C21D 1/42* (2006.01)

(56) References Cited

FOREIGN PATENT DOCUMENTS

| | | |
|---|---|---|
| JP | 2001-191714 | 7/2001 |
| JP | 2006-097818 | 4/2006 |
| JP | 2007-263213 | 10/2007 |
| JP | 2009-204064 | 9/2009 |
| JP | 2009-255659 | 11/2009 |
| JP | 2011-025732 | 2/2011 |
| WO | WO2007/091408 | 8/2007 |
| WO | WO2007-111316 | 10/2007 |
| WO | WO2008-142844 | 11/2008 |
| WO | WO2012/176787 | 12/2012 |

WHEEL BEARING APPARATUS

CROSS-REFERENCE TO RELATED APPLICATIONS

This application is a continuation of International Application No. PCT/JP2013/052218, filed Jan. 31, 2013, which claims priority to Japanese Application No. 2012-019966, filed Feb. 1, 2012. The disclosures of the above applications are incorporating herein by reference.

FIELD

The present disclosure relates to a wheel bearing apparatus for a freely rotationally supported wheel of a vehicle, such as an automobile and, more particularly, to a wheel bearing apparatus with a clutch function to switch a wheel between a driving mode and a non-driving mode.

BACKGROUND

In 4-wheel drive automobiles, a wheel bearing apparatus exists where the driver can selectively switch front wheels or rear wheels to driving wheels or driven wheels using a clutch. Such a wheel bearing apparatus 50, with the clutch function, includes, as shown in FIG. 6, a wheel hub 52 coaxially mounted on an axle 51 of a driving train. A double row tapered roller bearing 53, as the rolling bearing, is mounted on the wheel hub 52 at its axially center portion. A gear member 54 is axially juxtaposed by the double row tapered roller bearing 53. In addition, the wheel bearing apparatus 50 is coaxially supported on the axle 51, via a deep groove ball bearing 55. A needle bearing 56 is arranged between the axle 51 and the wheel hub 52. A reference character "G" denotes a slide gear.

The wheel hub 52 includes a cylindrical portion 57 formed coaxially with the axle 51. A flange 58 radially extends from the cylindrical portion 57 near the outer-side end. A caulked portion 59 is formed by bending an inner-side end of the cylindrical portion 57 radially outward. A hub-splined portion 60 includes a plurality of spline recesses (spline grooves) 60a and a plurality of spline projections 60b. The recesses 60a and splines 60b are alternately arranged between each other on the outer circumference of the cylindrical portion 57 near the caulked portion 59. The hub-splined portion 60 is engaged with an inner circumferential splined portion 61. The circumferential splined portion 61 includes spline recesses 61a and spline projections 61b. Both are formed on the inner circumference of the gear member 54. The flange 58 is formed with a plurality of through apertures 58a. Fastening members BO, such as bolts, are inserted through apertures 58a to fasten a wheel (not shown).

The double row tapered roller bearing 53 includes an inner ring 62, an outer member 63, and double row tapered rollers 64, 65 juxtaposed in an axial direction between the inner ring 62 and the outer member 63.

In more detail, the inner ring 62 includes a first inner ring member 66 and a second inner ring member 67. The first inner ring member 66 includes a first raceway surface 66a. The second inner ring member 67 has a second raceway surface 67a. The first inner ring member 66 and the second inner ring member 67 are arranged to abut against each other. An outer-side end face 66b of the first inner ring member 66 abuts against a root portion of the flange 58 of the wheel hub 52. The inner-side end face 67b of the second inner ring member 67 abuts against an end face of the gear member 54. Accordingly, the gear member 54 and the inner ring 62 (first and second inner ring members 66, 67), forming the double row tapered roller bearing 53, are firmly secured so as not to be rotated relative to the wheel hub 52.

On the other hand, the outer ring 63 includes a first raceway surface 63a, a second raceway surface 63b, and a flange portion 63c extending radially outward. The flange portion 63c is adapted to be secured to a steering knuckle (suspension apparatus) of a vehicle. A numeral 68 denotes sealing members.

The gear member 54 has a generally annular configuration. It is axially juxtaposed by the second inner member 67 so that it abuts against the end face 67b of the second inner ring member 67. The outer circumference of the gear member 54 is formed with a plurality of spline recesses (spline grooves) 69a and a plurality of spline projections 69b. Together, they form an outer circumferential splined portion 69. The outer circumferential splined portion 69 is adapted to engage with a splined portion G1 of the gear ring G.

As shown in FIG. 7, the inner circumferential edge, at its inner-side of the spline projection 61b of the inner circumferential splined portion 61 of the gear member 54, is chamfered to form an inner-side chamfered portion 70 with a curved surface. The chamfered portion 70 is designed to be positioned inner-side of the splined portion 60 of the wheel hub 52. In particular, it is designed so that a distance L is smaller than a distance X. The distance L is a distance from the inner-side end face 71 of the gear member 54 to the outer-side end 71a of the chamfered portion 70. The distance X is a distance from the inner-side end face 71 of the gear member 54 to the end point 60c of the spline recess 60a of the hub-splined portion 60 of the wheel hub 52. Thus, it is possible to increase the bending radius of the caulked portion 59 formed on the inner-side end of the cylindrical portion of the wheel hub 52. Accordingly, this effectively suppresses the generation of cracks in the root of the caulked portion 59 (e.g., see Patent Document 1 Japanese Patent No. 4466302.

As described above, it is possible in the prior art technology wheel bearing apparatus to increase the bending radius of the caulked portion 59. Accordingly, this effectively suppress the generation of cracks in the root of the caulked portion 59. When the driving torque is inputted to the gear member 54 from the driving/non-driving switching system, the gear member 54 transmits the driving torque to the wheel hub 52 via the inner circumferential splined portion 61. Although the inner circumferential splined portion 61 of the gear member 54 is hardened by heat treatment, the hub-splined portion 60 of the wheel hub 52 is rare and not hardened. Thus, allowable torque of the hub-splined portion 60 is limited and therefore it is required to reduce the torque applied to the hub-splined portion 60.

SUMMARY

It is, therefore, an object of the present disclosure to provide a wheel bearing apparatus that can reduce the torque applied to the splined portion of the wheel hub. Thus, this can improve the durability of the wheel hub.

To achieve the object of the present disclosure, a wheel bearing apparatus comprises an outer member and an inner member. The outer member is integrally formed on its outer circumference with a body mounting flange. The body mounting flange is adapted to be mounted on a knuckle of a suspension apparatus. The outer member inner circumference includes double row outer raceway surfaces. The inner member includes a wheel hub and at least one inner ring. The wheel hub is integrally formed at one end with a wheel mounting flange. A cylindrical portion axially extends from the wheel mounting flange. The inner ring is press-fit onto the cylindrical portion of the wheel hub, via a predetermined interference. The inner member outer circumferences include inner raceway surfaces corresponding to the outer raceway surfaces of the outer member. Double row rolling elements are freely rollably contained between the inner and outer raceway surfaces of the inner and outer members, via cages. A hardened ring-shaped gear member is mounted on an end of the cylindrical portion of the wheel hub. The gear member is formed with a gear portion on its outer circumference. The gear member inner circumference includes a splined portion engaging a hub-splined portion formed on the outer circumference of the cylindrical portion of the wheel hub. Both the contacting surface of the gear member and the contacting surface of the inner ring, which abuts against each other, are ground. The inner rings are axially immovably secured to the inner member. Thus, a condition exists where a predetermined amount of a bearing pre-stress is applied to the inner rings via the gear member.

Wheel bearing apparatus of the second or third generation structures where the gear member, for selectively switching the 4-wheel driving mode or 2-wheel driving mode, is secured on the inner member may include the above wheel hub and the inner ring(s). A hardened ring-shaped gear member is mounted on an end of the cylindrical portion of the wheel hub. The gear member is formed, on its outer circumference, with a gear portion. The gear member inner circumference includes a splined portion that engages a hub-splined portion formed on the outer circumference of the cylindrical portion of the wheel hub. A contacting surface of the gear member and a contacting surface of the inner ring abuts against each other are ground. The inner rings are axially immovably secured under a condition where a predetermined amount of a bearing pre-stress is applied to the inner rings, via the gear member. This arrangement makes it possible to provide a wheel bearing apparatus that can attain close contact and accordingly large frictional resistance between the contacting surfaces of the inner ring and the gear member. Thus, this reduces the torque applied to the hub-splined portion. Finally, it improves the durability of the wheel bearing apparatus. More particularly, the contacting surfaces of the inner ring and the gear member are ground. The frictional resistance of the contacting surfaces can be increased due to their close contact. Thus, it is possible to transmit the torque via the closely contacted surfaces of the inner ring and the gear member. Thus, this reduces the torque applied to the hub-splined portion.

The surface roughness Ra of the contacting surface of the gear member contacts against the inner ring is set to 1.6 or less (Ra≤1.6). This makes it possible to have close contact of the contacting surfaces of the inner ring and the gear member and frictional resistance between them.

The inner rings are secured by a caulked portion. The caulked portion is formed by plastically deforming the end of the cylindrical portion of the wheel hub. The caulked portion is kept as a non-hardened portion with the surface hardness after forging. This makes it possible to generate a difference in the hardness between the gear member and the caulked portion. Thus, this prevents the generation of problems, such as the generation of micro-cracks in the caulked portion. In addition, it is possible to keep the initially set bearing pre-pressure for a long term while preventing the generation of deformation or micro-cracks due to the generation of excessive stress in the gear member.

An external thread is formed on the end of the cylindrical portion of the wheel hub. A securing nut is fastened on the external thread to secure the inner rings.

The contacting width between the gear member and the caulked portion or the securing nut is set to 1 mm or more (≥1 mm). This makes it possible to assure a desired axial force by pressing the inner ring. Thus, this prevents the bearing pre-pressure from being dissipated when any external force is applied to the wheel bearing apparatus.

The gear member is formed of steel including carbon of 0.15~0.45% by weight (wt %). It is hardened to its core by dip quenching. The surface hardness of the gear member is set to 40 HRC or more. This makes it possible to have the gear portion with moderate hardness and to assure a desirable strength of the gear member not only in its gear portion but in its whole body.

The gear member is formed of chrome molybdenum steel including Mo of 0.15~0.3% by weight (wt %). A hardened layer is formed on the surface of the gear member by carburizing quenching. The surface hardness of the hardened layer is set to 40 HRC or more. This makes it possible to suppress brittleness of the gear member. Thus, this prevents the generation of micro-cracks during the caulking process and assures strength when the driving force is applied to the gear member.

A hardened layer with a surface hardness of 50~64 HRC is formed on part of the hub-splined portion by high frequency induction hardening. This makes it possible to suppress wear of the hub-splined portion and to increase allowable torque. Thus, this improves the durability of the wheel bearing apparatus.

According to the wheel bearing apparatus of the present disclosure, it includes an outer member and an inner member. The outer member is integrally formed with a body mounting flange on its outer circumference. The body mounting flange is adapted to be mounted on a knuckle of a suspension apparatus. The outer member inner circumference includes double row outer raceway surfaces. The inner member includes a wheel hub and at least one inner ring. The wheel hub is integrally formed at one end with a wheel mounting flange. A cylindrical portion axially extends from the wheel mounting flange. The inner ring is press-fit onto the cylindrical portion of the wheel hub, via a predetermined interference. The inner rings outer circumferences are formed with inner raceway surfaces corresponding to the outer raceway surfaces of the outer member. Double row rolling elements are freely rollably contained between the inner and outer raceway surfaces of the inner and outer members via cages. A hardened ring-shaped gear member is mounted on an end of the cylindrical portion of the wheel hub. The gear member is formed with a gear portion on its outer circumference. The gear member inner circumference includes a splined portion. The splined portion engages a hub-splined portion formed on the outer circumference of the cylindrical portion of the wheel hub. Both a contacting surface of the gear member and a contacting surface of the inner ring that abut against each other are ground. The inner rings are axially immovably secured under a condition where a predetermined amount of a bearing pre-stress is applied to the inner rings, via the gear member. Thus, it is possible to provide a wheel bearing apparatus that can attain close contact. Accordingly, large frictional resistance occurs between the contacting surfaces of the inner ring and the gear member. Thus, this reduces the torque applied to the hub-splined portion and finally improves the durability of the wheel bearing apparatus. More particularly, the contacting surfaces of the inner ring and the gear member are ground. The frictional resistance of the contacting surfaces can be increased due to close contact. Thus, it is possible to transmit the torque via the closely contacted surfaces of the inner ring and the gear member. Thus, this reduces the torque applied to the hub-splined portion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4(a) shows a condition before caulking.

FIG. 4(b) shows a condition after caulking.

DETAILED DESCRIPTION

A wheel bearing apparatus comprises an outer member and an inner member. The outer member is integrally formed with a body mounting flange on its outer circumference. The body mounting flange is adapted to be mounted on a knuckle of a suspension apparatus. The outer member inner circumference includes double row outer raceway surfaces. The inner member includes a wheel hub and at least one inner ring. The wheel hub is integrally formed on one end with a wheel mounting flange. A cylindrical portion axially extends from the wheel mounting flange. The inner rings outer circumferences are formed with inner raceway surfaces that correspond to the outer raceway surfaces of the outer member. The inner rings are press-fit onto the cylindrical portion of the wheel hub, via a predetermined interference. The inner rings are axially secured by a caulked portion. The caulked portion is formed by plastically deforming the end of the cylindrical portion of the wheel hub. Double row rolling elements are freely rollably contained between the inner and outer raceway surfaces of the inner and outer members, via cages. A hardened ring-shaped gear member is mounted on an end of the cylindrical portion of the wheel hub. The gear member is formed on its outer circumference with a gear portion. Its inner circumference includes a splined portion. The gear member splined portion engages a hub-splined portion formed on the outer circumference of the cylindrical portion of the wheel hub. The surface roughness Ra of the contacting surface of the gear member abutted against the inner ring is set to 1.6 or less (Ra≤1.6). The inner rings are axially immovably secured by the caulked portion under a condition where a predetermined amount of a bearing pre-stress is applied to the inner rings, via the gear member.

Preferable embodiments of the present disclosure will be hereinafter described with reference to the drawings.

Figure 1:
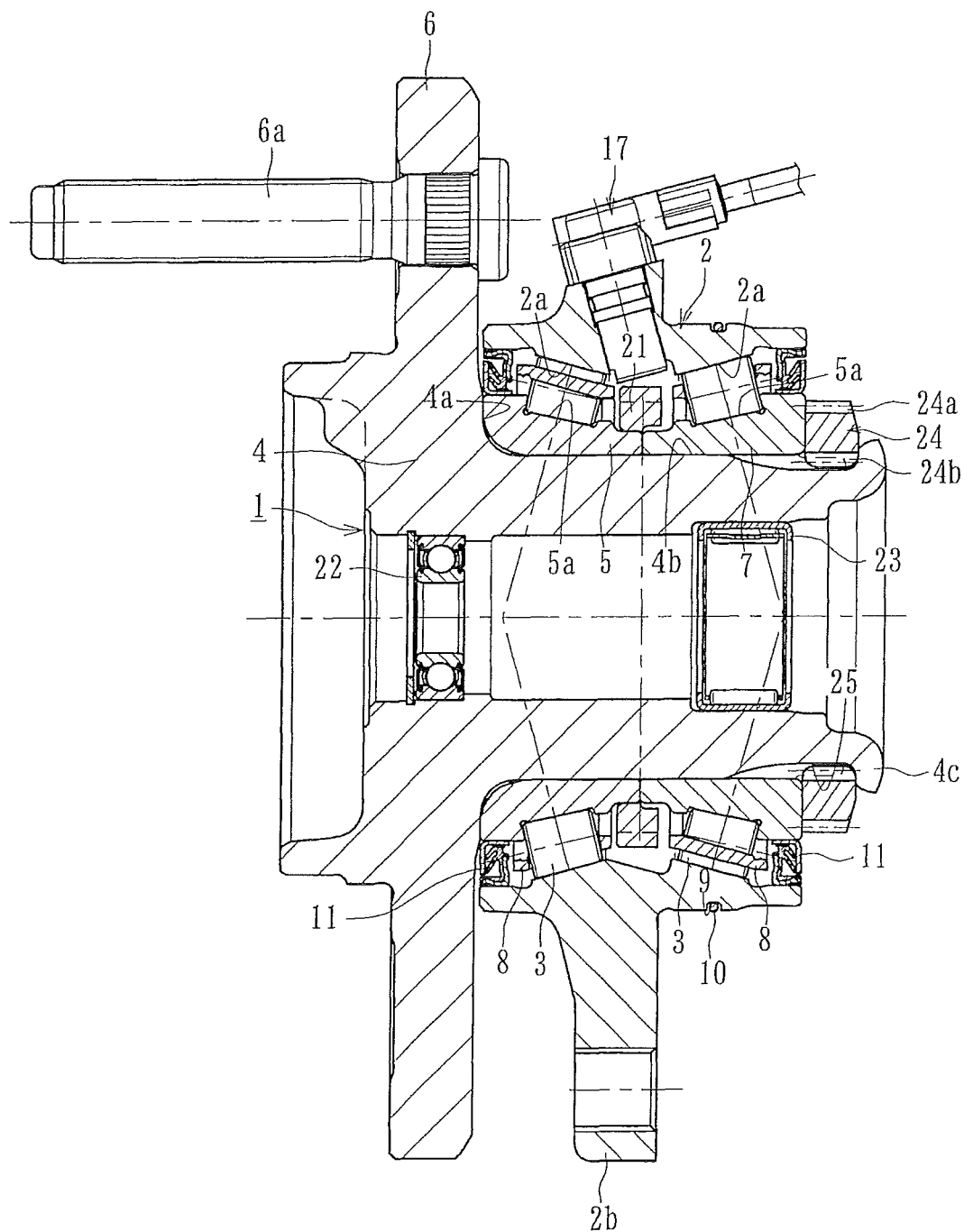
FIG. 1 is a longitudinal section view of a first embodiment of a wheel bearing apparatus.
Figure 2:
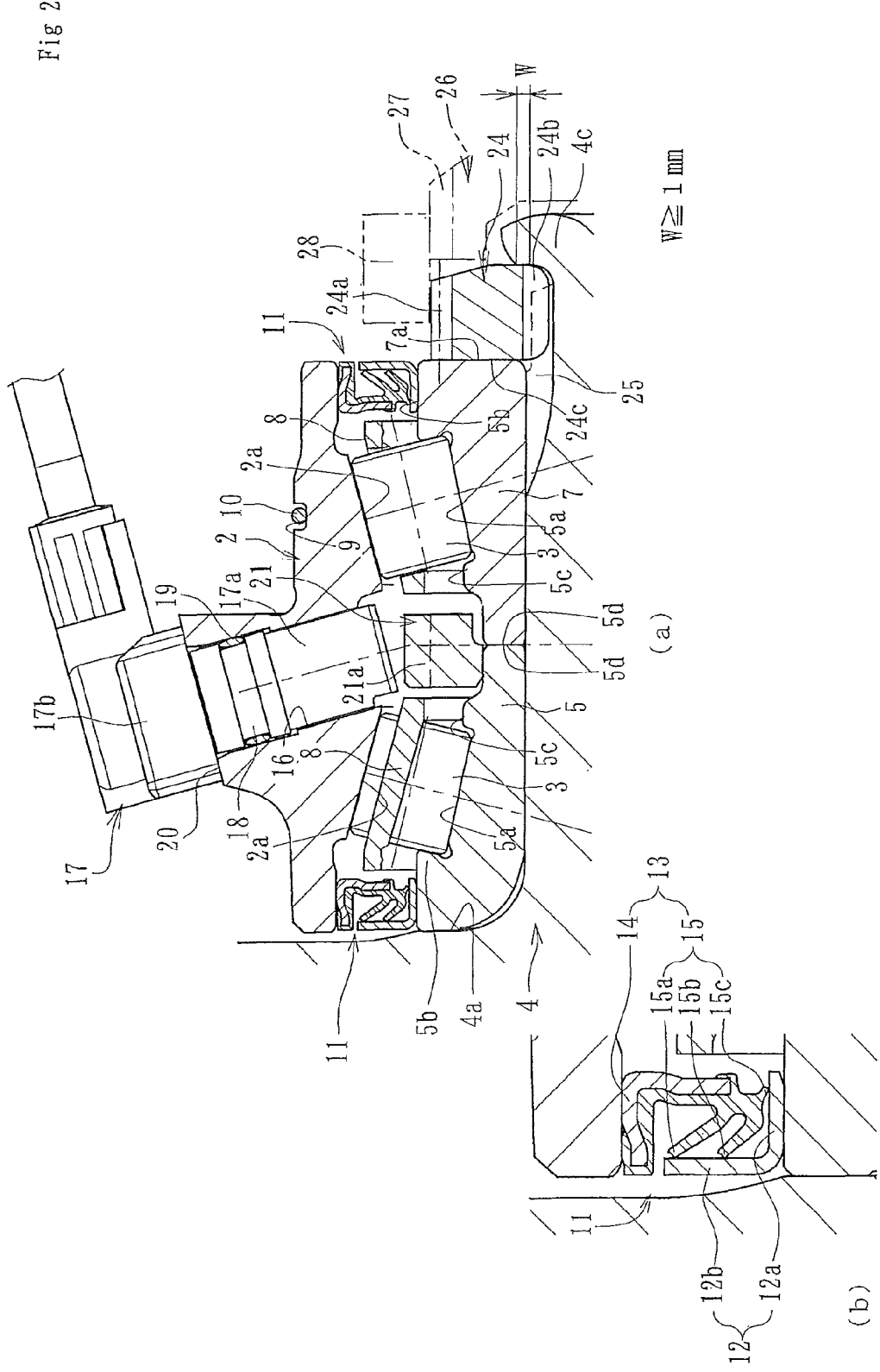
FIG. 2(a) is a partially enlarged view of a bearing portion of FIG. 1.
FIG. 2(b) is a partially enlarged view of a seal of FIG. 1.
Figure 3:
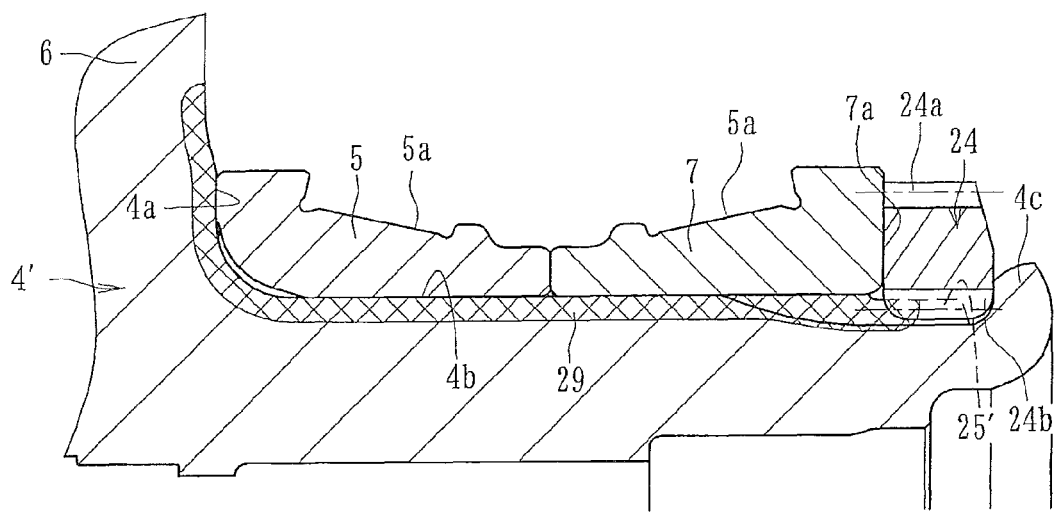
FIG. 3 is a partially enlarged view of a modification of the embodiment of FIG. 1.
Figure 4:
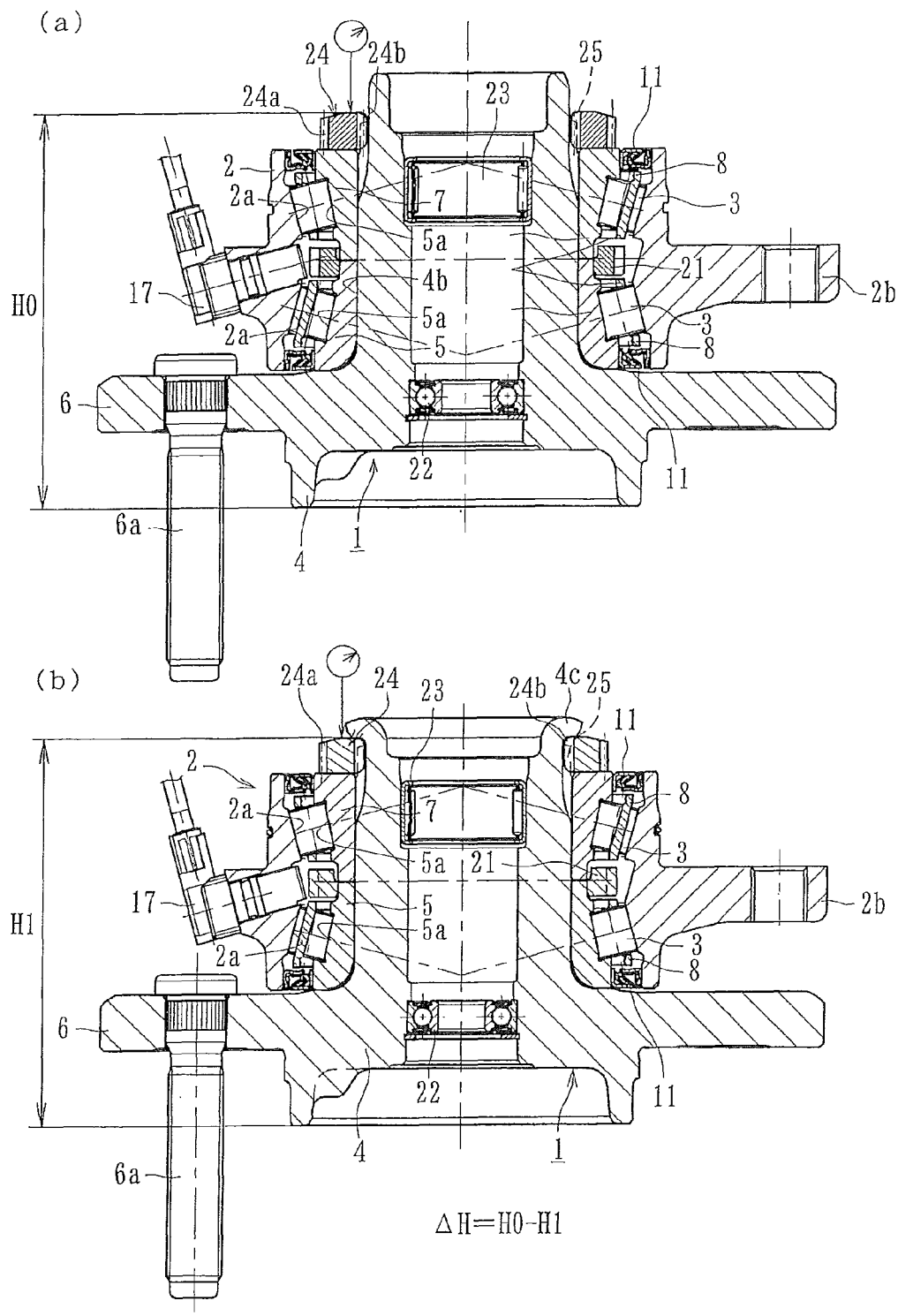
FIG. 4 is an explanatory view of methods for controlling the axial force of the wheel bearing apparatus.

FIG. 1 is a longitudinal section view of a first embodiment of the wheel bearing apparatus. FIG. 2(a) is a partially enlarged view of a bearing portion of FIG. 1. FIG. 2(b) is a partially enlarged view of a seal of FIG. 1. FIG. 3 is a partially enlarged view of a modification of the embodiment of FIG. 1. FIG. 4 are explanatory views of methods for controlling the axial force of the wheel bearing apparatus. FIG. 4(a) illustrates a condition before caulking. FIG. 4(b) illustrates a condition after caulking. In the description of the present disclosure, an outer-side of the wheel bearing apparatus, when it is mounted on a vehicle, is referred to as the "outer-side" (left-side in drawings). An inner-side of a bearing apparatus, when it is mounted on a vehicle, is referred to as the "inner-side" (right-side in figures).

The wheel bearing apparatus of this embodiment is used for a driving wheel. It includes an inner member 1, an outer member 2, and double row rolling elements (tapered rollers) 3, 3. The rolling elements 3, 3 are rollably contained between the inner and outer members 1, 2. The inner member 1 includes a wheel hub 4 and a pair of inner rings 5, 7. The inner rings 5, 7 are secured on the wheel hub 4, via plastic deformation, of the wheel hub 4.

The wheel hub 4 is integrally formed with a wheel mounting flange on its outer-side end. The wheel mounting flange 6 mounts a wheel (not shown). A cylindrical portion 4b extends axially from the wheel mounting flange 6, via a shoulder portion 4a. Hub bolts 6a are also arranged equidistantly along the periphery of the wheel mounting flange 6.

Each of the pair of inner rings 5, 7 is formed with a tapered inner raceway surface 5a on its outer circumference. The inner rings 5, 7 are press-fit onto the cylindrical portion 4b of the wheel hub 4. As shown in the enlarged view of FIG. 2(a), larger ribs 5b, 5b are formed on the larger diameter sides of the inner raceway surfaces 5a, 5a to guide the rolling elements 3, 3. Smaller ribs 5c, 5c are formed on smaller diameter sides of the inner raceway surfaces 5a, 5a to prevent falling out of the rolling elements 3, 3. Both the inner rings 5, 7 are mounted on the cylindrical portion 4b of the wheel hub 4. The smaller-side end faces abut each other and form a double row tapered roller bearing of the back-to-back duplex type bearing. The pair of inner rings 5, 7 is basically the same with each other except that the chamfered portion of the larger diameter-side of the outer-side inner ring 5 has a larger diameter than that of the larger diameter-side of the inner-side inner ring 7.

As shown in FIG. 1, the outer member 2 is integrally formed with a body mounting flange 2b on its outer circumference. The body mounting flange 2b is mounted on a knuckle (not shown). The outer member inner circumference includes outwardly tapered double row outer raceway surfaces 2a, 2a. The double row tapered rollers 3, 3 are freely rollably contained between the inner and outer raceway surfaces of the inner and outer members 1 and 2, via cages 8. Sealing between the knuckle and the outer member 2 can be accomplished by an elastic ring 10, such as an O-ring. The ring 10 fits in an annular groove 9 formed on the outer circumference of the outer member 2.

The wheel hub 4 is made of medium/high carbon steel (JIS SC-carbon steel for machine structural use) including carbon of 0.40~0.80% by weight such as S53C. It is hardened by high frequency induction hardening so that a region from the shoulder portion 4a to the cylindrical portion 4b has a surface hardness of 58~64 HRC. The inner rings 5, 7 and rolling elements 3 are formed of high carbon chrome steel such as SUJ2. They hardened to their core by dip quenching to have a hardness of 58~64 HRC. The caulking portion 4c described later, remains in a non-hardened condition with its surface hardness after forging. This makes the caulking operation easy and prevents the generation of micro-cracks during the caulking operation. Also, it increases the durability of the wheel hub 4 by providing sufficient mechanical strength against the rotary bending load applied to the wheel mounting flange 6.

Similarly to the wheel hub 4, the outer member 2 is made of medium/high carbon steel including carbon of 0.40~0.80% by weight such as S53C. It is hardened by high frequency induction hardening so that at least the double row outer raceway surfaces 2a, 2a have a surface hardness of 58~64 HRC. Seals 11, 11 are mounted within annular openings formed between the outer member 2 and inner rings 5, 7. The seals 11, 11 prevent leakage of grease contained within the bearing and entry of rain water and dust into the bearing from the outside.

As shown in a partially enlarged view of FIG. 2(b), the seal 11 includes a slinger 12 and an annular sealing plate 13 to formed a so-called "pack seal". The slinger 12 is press-formed of a ferromagnetic steel plate, such as a ferritic stainless steel sheet (JIS SUS 430 etc.), or preserved cold rolled steel sheet (JIS SPCC etc.). The slinger 12 has a substantially L-shaped longitudinal section. A cylindrical portion 12a is press-fit into the larger rib portions 5b of the inner rings 5, 7. A standing portion 12b extends radially outward from the cylindrical portion 12a.

On the other hand, the sealing plate 13 includes a metal core 14 fit into the end of the outer member 2. A sealing member 15 is integrally adhered to the metal core 14, via vulcanized adhesion. The metal core 14 is press-formed of austenitic stainless steel sheet or preserved cold rolled steel sheet. The sealing plate 13 has a substantially L-shaped longitudinal section.

Sealing member 15 is formed of synthetic rubber such as NBR (acrylonitrile-butadiene rubber) etc. It is integrally formed with a pair of side lips 15a, 15b and grease lip 15c. The side lips 15a and 15b angularly extend radially outward. The grease lip 15c angularly extends toward the inside of the bearing. The side lips 15a, 15b slidingly contact with the inner-side surface of the standing portion 12b of the slinger 12, via a predetermined axial interface. The grease lip 15c slidingly contacts with the cylindrical portion 12a of the slinger 12, via a predetermined radial interference. There are, other than NBR, examples of material of the sealing member 15 such as HNBR (hydrogenation acrylonitric-butadien rubber), EPDM (ethylene propylene rubber), ACM poly-acrylic rubber) superior in heat and chemical resistance, FKM (fluororubber) or silicone rubber.

In this embodiment, a rotational speed sensor 17 is inserted into a sensor insertion aperture 16. The aperture 16 extends radially between the outer raceway surfaces 2a and 2a of the outer member 2. The rotational speed sensor 17 is embedded in synthetic resin. The sensor 17 includes an IC circuit incorporated with a Hall element, magnetic resistance element (MR element), and a waveform shaping circuit to shape the output waveform of the magnetic detecting element. The rotational speed sensor 17 includes an insertion portion 17a and a non-insertion portion 17b. The insertion portion 17a is inserted into the insertion aperture 16. The non-insertion portion 17b is positioned outside of the outer member 2. An annular groove 18 is formed on the outer circumference of the insertion portion 17a. An elastic ring 19, such as O-ring etc., is fit into the groove 18. The non-insertion portion 17b is configured so that it sits on the sensor mounting portion 20 of the outer member 2. It is fastened thereto via a mounting piece (not shown) that extends laterally.

On the other hand, a pulsar ring 21 is secured on the outer circumference of the smaller rib 5c of the outer-side inner ring 5. The pulsar ring 21 opposes the rotational speed sensor 17, via a predetermined radial gap (air gap). This pulsar ring 21 is formed like a gear, having teeth 21a. Accordingly, it is possible to detect the rotational speed of a wheel via the rotational speed sensor 17. This is accomplished based on alternative variation in magnetic fields due to rotation of the wheel hub 4.

Rigid fixation of the inner rings 5, 7 to the cylindrical portion 4b of the wheel hub 4 is performed by press-fitting the inner rings 5, 7 onto the cylindrical portion 4b of the wheel hub 4, via a predetermined interference. The caulked portion 4c is formed by plastically deforming the end portion of the cylindrical portion 4b radially outward (see FIG. 1).

Although it is shown as a double row tapered roller bearing, the present disclosure may be applied to a double row angular contact ball bearing using balls as rolling elements.

As shown in FIG. 1, a shaft portion of an outer joint member, forming a constant velocity universal joint (not shown), is adapted to be rotationally supported in the wheel hub 4, via rolling bearings 22, 23. The outer-side rolling bearing 22 is a deep groove ball bearing. The inner-side rolling bearing 23 is a shell type needle roller bearing.

As shown in FIG. 2(a), the inner ring 7 is axially secured on the wheel hub 4 by the caulked portion 4c via a ring-shaped gear member 24. The gear member 24 is formed with a gear portion 24a on its outer circumference. The gear member 24 inner circumference includes a splined portion 24b. The splined portion 24b is adapted to engage a hub-splined portion 25. The hub splined portion 25 is formed on the outer circumference of the cylindrical portion 4b of the inner-side end of the wheel hub 4. The gear member 24 is pressed onto the inner ring 7 by a caulking pressure from the caulked portion 4c. The caulked portion 4c acts on the inner-side end face of the gear member 24. Thus, fixation of the gear member 24 and the pair of inner ring 5, 7 relative to the wheel hub 4 can be surely attained by the caulking pressure applied by the caulked portion 4c.

The gear portion 24a of the gear member 24 can selectively engage a ring-shaped slide gear 28. The slide gear 28 engages a gear portion 27 of the outer joint member 26. Thus, the gear member 24 may engage gear portion 27 by selectively sliding the slide gear 28. Under a condition where the gear member 24 and the gear portion 27 are engaged with each other, via the slide gear 28, the driving force can be transmitted from the constant velocity universal joint to a wheel via both the inner ring 7 and the wheel hub 4. That is, the wheel supported by the wheel hub 4, in this case. functions as a driving wheel. On the contrary, under a condition where the gear member 24 and the gear portion 27 are not engaged with each other, the driving force cannot be transmitted to a wheel. In this case, the wheel supported by the wheel hub 4 functions as a driven wheel. Thus, the switching between a 4-wheel driving and 2-wheel driving can be selectively performed.

According to the present disclosure, the gear member 24 is formed of steel including carbon of 0.15~0.45% by weight (wt %), preferably 0.38~0.43% by weight (wt %). It is hardened to its core by dip quenching to have a hardness of 40~55 HRC (392~600 HV).

The gear member 24 has an amount of Cr content of about 0.09~0.12% by weight, which is higher than that of the wheel hub 4, which is formed of medium/high carbon steel, such as S53C etc. Thus, the gear member 24 has higher tenacity. When a gear member 24 including carbon amount corresponding to high carbon steel is dip quenched, its hardness will be HRC 60 (700 HV). However, since the gear member 24 is formed of steel including a carbon amount less than that of medium/high carbon and hardened by dip quenching, it is possible to have a gear member 24 with a gear portion of moderate hardness. Thus, the gear member 24 has a hardness higher by substantially 132~340 HV than hardness 260 HV of the caulked portion 4c. Accordingly, desirable strength can be assured throughout the gear member 24 other than the gear portion 24a and the splined portion 24b. Thus, it is possible to prevent the generation of excessive stress in the gear member 24. Accordingly, this prevents the generation of deformations or micro-cracks during the caulking process. In addition, it is possible to plastically deform the end of the cylindrical portion 4b of the wheel hub 4 radially outward to form the caulked portion 4c without causing the generation of micro-cracks. Thus, this keeps the initially set bearing pre-pressure for a long term.

The gear member 24 is formed of chrome molybdenum steel such as SCM 440 or SCM 430 including Mo of 0.15~0.3% by weight (wt %). It has a hardened layer formed on the surface of the gear member 24 by carburizing quenching. The surface hardness of the hardened layer is set to 40~55 HRC or more. This makes it possible to suppress brittleness of the gear member 24. Thus, this prevents the generation of micro-cracks during the caulking process and assures the strength when the driving force is applied to the gear member 24.

According to the present disclosure, the surface roughness of the larger end face 7a of the inner ring 7 is set to Ra 0.63 or less by grinding after heat treatment. The surface roughness of the contact surface 24c of the gear member 24 that abuts against the larger end face 7a of the inner ring 7 is set to Ra 1.6 or less (Ra≤1.6), preferably Ra 0.63 or less (Ra≤0.63). This makes it possible to have close contact of the contacting surfaces 7a, 24a of the inner ring 7 and the gear member 24 and frictional resistance between them. Thus, this provides a wheel bearing apparatus that can reduce torque to be loaded on the hub-spline portion 25. Thus, it improves the durability. "Ra" is one of roughness shape parameters in JIS (JIS B0601-1994) and defined as an average value of absolute deviations from an average line (arithmetical average roughness).

Furthermore, a contacting width W between the gear member 24 and the caulked portion 4c is set to 1 mm or more (≥1 mm). This makes it possible to assure a desired axial force by pressing the inner ring 7. That is, it is usually necessary to prevent the bearing pre-pressure from being dissipated when any external force is applied to the wheel bearing apparatus relative to the maximum axial force 20 kN inputted to the wheel bearing apparatus during running of a vehicle. In a test of caulking carried out by an applicant, it was found from the measurement of axial force obtained by varying amount of caulking, that the contacting width W of at least 1 mm between the gear member 24 and the caulked portion 4c is necessary to assure the lower limit value of 20 kN of the axial force.

FIG. 3 is a modification of the first embodiment of FIG. 1. In this modification, a hardened layer 29 (shown by cross-hatchings), with a surface hardness of 50~64 HRC, is formed on part of the hub-splined portion 25'. It is formed by high frequency induction hardening. The splined portion 24b of the gear member 24 engages the hub-splined portion 25'. This makes it possible to suppress wear of the hub-splined portion 25' and to increase allowable torque. Thus, this improves the durability of the wheel bearing apparatus.

A controlling method of an axial force (bearing clearance) of the wheel bearing apparatus of the present disclosure will be described with reference to FIG. 4. The inner ring 7 and the gear member 24 are elastically deformed by caulking. The elastic deformation will reduce the bearing clearance. There is a relative relation between an amount of the elastic deformation and an amount of the clearance reduction. Thus, a regression formula can be prepared by performing a test on the amount of the elastic deformation and the amount of the clearance reduction relating to bearings having similar specifications.

The height H0 before caulking is the bearing clearance before caulking of the gear member before caulking. That is, as shown in FIG. 4(a), the height H0 of the gear member 24 from the outer-side end of the wheel hub 4 is measured under a condition where the gear member is inserted onto the cylindrical end before caulking of the cylindrical portion 4b. The splined portion 24b of the gear member 24 engages the hub-splined portion 25. The outer-side end face of the gear member 24 closely contacts with the larger end face 7a of the inner ring 7. Then as shown in FIG. 4(b), a height H1 is measured after caulking of the gear member 24. The amount of clearance reduction can be calculated according to the previously confirmed regression formula from the amount of height variation (amount of elastic variation) $\Delta H=H0-H1$. Finally, the bearing clearance after caulking can be calculated by subtracting the amount of clearance reduction from the bearing clearance before caulking.

The bearing clearance according to the pre-pressure after caulking is set to a negative clearance. Thus, a direct measurement is impossible. The amount of pre-pressure can be indirectly controlled from the amounts of elastic deformation of the inner ring 7 and the gear member 24 by measuring the heights of the gear member 24 before and after caulking of the gear member 24. In the present disclosure, the gear member 24 is hard to plastically deform by caulking. Thus, it is possible to exactly measure the amount of elastic deformation and thus to perform the exact and stable pre-pressure control while suppressing variance of measurements.

Figure 5:
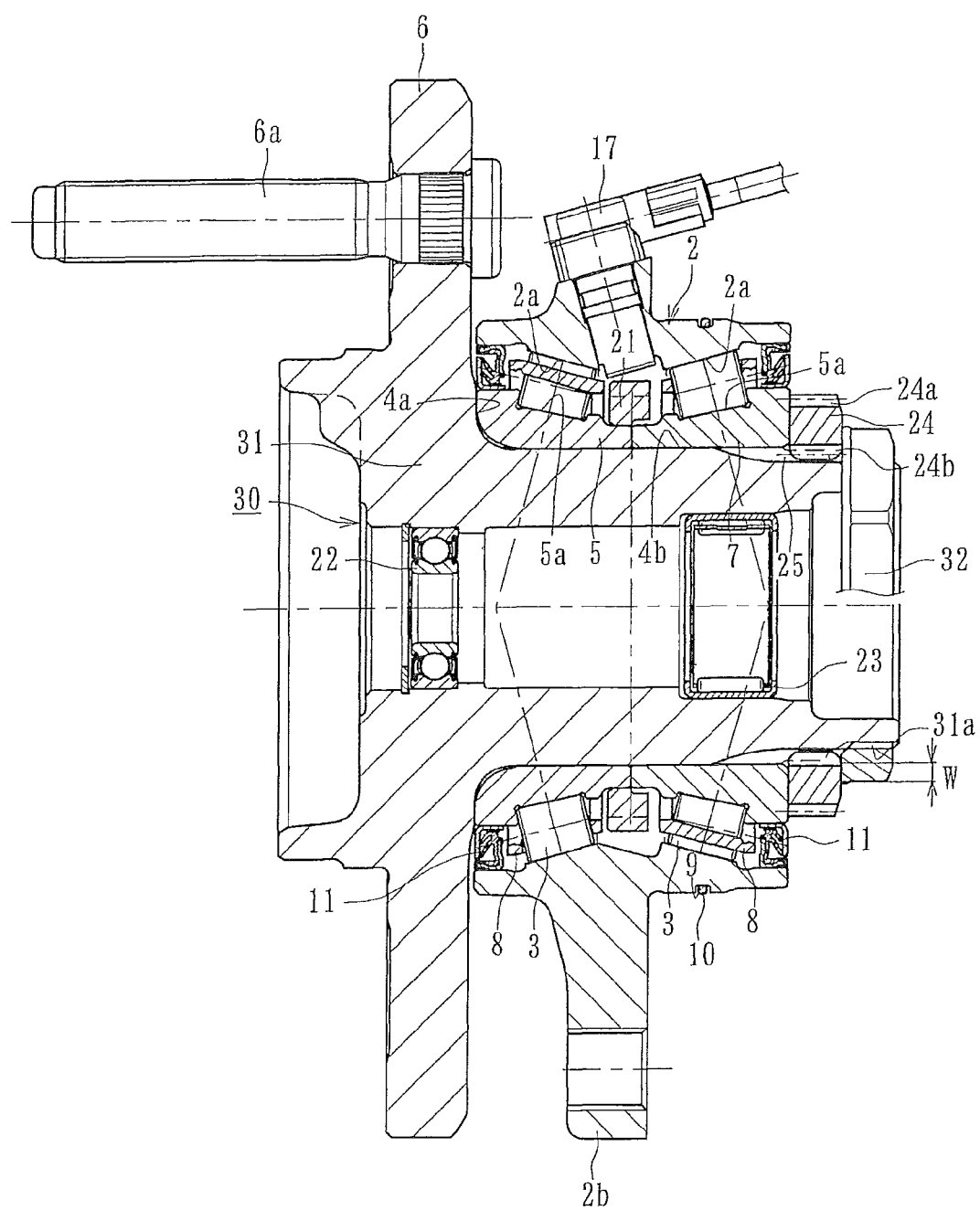
FIG. 5 is a longitudinal section view of a first embodiment of a wheel bearing apparatus.
Figure 6:
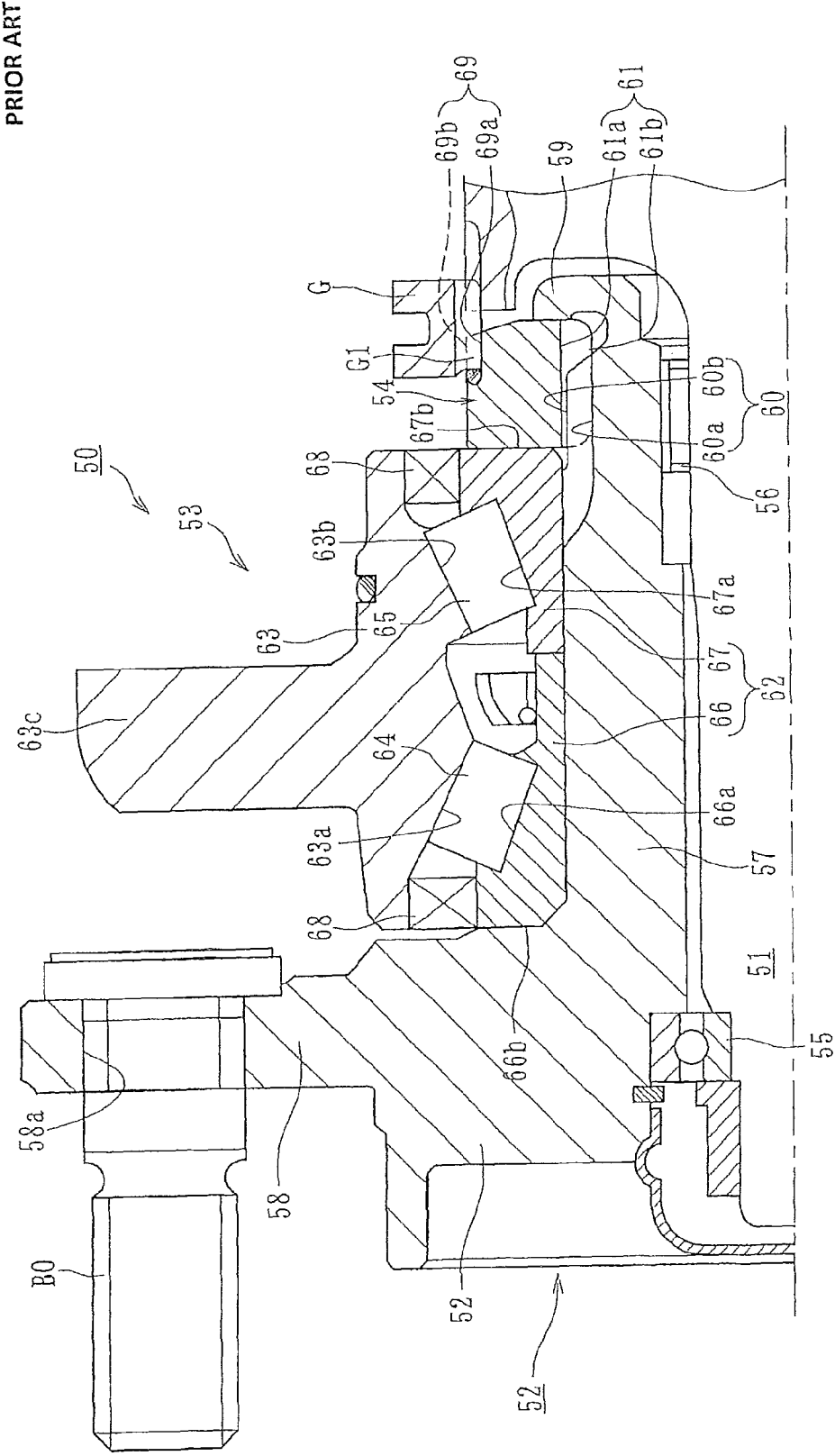
FIG. 6 is a longitudinal section view of a wheel bearing apparatus.
Figure 7:
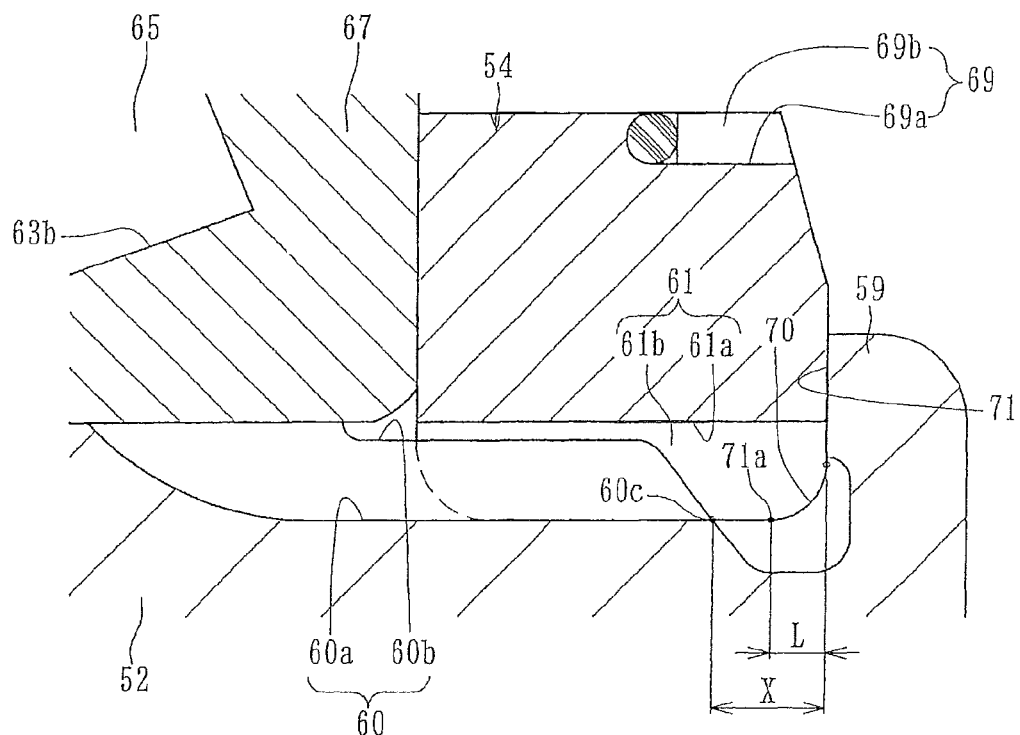
FIG. 7 is a partially enlarged view of FIG. 6.

FIG. 5 is a longitudinal section view of a second embodiment of the wheel bearing apparatus. This embodiment is basically different only in means for applying the axial force to the inner rings. Thus, the same reference numerals as used in the previous embodiment are also used on like parts or portions having the same functions in this embodiment.

The wheel bearing apparatus of this embodiment includes an inner member 30, an outer member 2, and double row rolling elements 3, 3 rollably contained between the inner and outer members 30, 2. The inner member 30 includes a wheel hub 31 and a pair of inner rings 5, 7 secured on the wheel hub 31, via plastic deformation of the wheel hub 31.

The wheel hub 31 is integrally formed with a wheel mounting flange 6 on its outer-side end. A cylindrical portion 4b extends axially from the wheel mounting flange 6, via a shoulder portion 4a. An external thread 31a is formed on the end of the cylindrical portion 4b of the wheel hub 31. A securing nut 32 is fastened on the external thread 31a to secure the pair of inner rings 5, 7.

According to this embodiment, the contacting width W between the gear member 24 and the securing nut 32 is set to 1 mm or more. This makes it possible to assure a desired axial force by pressing the inner ring 7, via the gear member 24, by fastening the securing nut 32.

The wheel bearing apparatus of the present disclosure can be applied to the wheel bearing apparatus of the second and third generation types where the gear member for switching 4-wheel drive and 2-wheel drive is secured on an inner member including a wheel hub and an inner ring fit on the wheel hub.

The present disclosure has been described with reference to the preferred embodiments and modifications. Obviously, other modifications will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A wheel bearing apparatus comprising:
   an outer member integrally formed with a body mounting flange on its outer circumference, the body mounting flange adapted to be mounted on a knuckle of a suspension apparatus, the outer member inner circumference includes double row outer raceway surfaces;
   an inner member includes double row inner raceway surfaces, a wheel hub and at least one inner ring, the wheel hub is integrally formed with a wheel mounting flange on its one end, a cylindrical portion axially extends from the wheel mounting flange, the at least one inner ring is press-fit onto the cylindrical portion of the wheel hub via a predetermined interference, the at least one inner ring outer circumference is formed with one of the double row inner raceway surfaces that corresponds to one of the double row outer raceway surfaces of the outer member;
   double row rolling elements are freely rollably contained between the inner and outer raceway surfaces of the inner and outer members, via cages;
   a hardened ring-shaped gear member is mounted on an end of the cylindrical portion of the wheel hub, the gear member is formed with a gear portion on its outer circumference and with a splined portion on its inner circumference, the splined portion engages a hub-splined portion formed on the outer circumference of the cylindrical portion of the wheel hub;
   a contacting surface of the gear member and a contacting surface of the at least one inner ring that abut against each other are ground to provide a desired roughness on the contacting surfaces to enable close contact and frictional resistance between the contacting surfaces to reduce torque on the splined portion; and
   the at least one inner ring is axially immovably secured to the wheel hub under a condition where a predetermined amount of a bearing pre-stress is applied to the at least one inner ring, via the gear member.

2. The wheel bearing apparatus of claim 1, wherein the surface roughness (Ra) of the contacting surface of the gear member contacting against the inner ring is set to 1.6 or less (Ra≤1.6).

3. The wheel bearing apparatus of claim 1, wherein the inner rings are secured by a caulked portion formed by plastically deforming the end of the cylindrical portion of the wheel hub, and the caulked portion is kept as a non-hardened portion with a surface hardness after forging.

4. The wheel bearing apparatus of claim 3, wherein a contacting width (W) between the gear member and the caulked portion is set to 1 mm or more.

5. The wheel bearing apparatus of claim 1, wherein an external thread is formed on the end of the cylindrical portion of the wheel hub, and a securing nut is fastened on the external thread to secure the inner rings.

6. The wheel bearing apparatus of claim 5, wherein a contacting width (W) between the gear member and the securing nut is set to 1 mm or more.

7. The wheel bearing apparatus of claim 1, wherein the gear member is formed of steel including carbon of 0.15~0.45% by weight (wt%), the gear member is hardened to its core by dip quenching, and the gear member has a surface hardness of 40 HRC or more.

8. The wheel bearing apparatus of claim 1, wherein the gear member is formed of chrome molybdenum steel including Mo of 0.15~0.3% by weight (wt%), a hardened layer is formed on a surface of the gear member by carburizing quenching, and the hardened layer has a surface hardness set to 40 HRC or more.

9. The wheel bearing apparatus of claim 1, wherein a hardened layer having the surface hardness of 50~64 HRC is formed on part of the hub-splined portion by high frequency induction hardening.

* * * * *